US007039421B2

(12) United States Patent
Couronne et al.

(10) Patent No.: US 7,039,421 B2
(45) Date of Patent: May 2, 2006

(54) SYSTEM FOR DETERMINING THE POSITION OF AN OBJECT

(75) Inventors: Sylvie Couronne, Erlangen (DE); Stefan Koehler, Roedental (DE); Guenter Rohmer, Erlangen (DE); Thomas Von Der Gruen, Kleinsendelbach (DE); Ingmar Bretz, Regenstauf (DE); Heinz Gerhaeuser, Waischenfeld (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 464 days.

(21) Appl. No.: 10/416,094

(22) PCT Filed: Oct. 31, 2001

(86) PCT No.: PCT/EP01/12646

§ 371 (c)(1), (2), (4) Date: Jun. 24, 2003

(87) PCT Pub. No.: WO02/39139

PCT Pub. Date: May 16, 2002

(65) Prior Publication Data

US 2004/0012524 A1 Jan. 22, 2004

(30) Foreign Application Priority Data

Nov. 8, 2000 (DE) ................................ 100 55 289

(51) Int. Cl.
*H04Q 7/20* (2006.01)

(52) U.S. Cl. .................... 455/456.1; 342/386; 701/207

(58) Field of Classification Search ............. 455/456.1, 455/404.2, 440, 457; 342/387, 464, 386; 701/207
See application file for complete search history.

(56) References Cited

U.S. PATENT DOCUMENTS

| | | | |
|---|---|---|---|
| 3,750,178 A | 7/1973 | Hulst | |
| 4,673,921 A * | 6/1987 | Saito et al. ............ | 340/539.32 |
| 5,208,756 A | 5/1993 | Song | |

(Continued)

FOREIGN PATENT DOCUMENTS

| | | |
|---|---|---|
| DE | 1 240 146 | 5/1967 |
| DE | 1 813 128 | 6/1970 |
| DE | 21 37 8460 B2 | 2/1973 |

(Continued)

OTHER PUBLICATIONS

Manfred Bohm et al., “Funksysteme fur Ortung und Navigation”, Verlag Berliner Union GmbH Stuttgart, 1973, pp. 27, 92-104, no month listed.

*Primary Examiner*—Charles N Appiah
*Assistant Examiner*—Nghi H. Ly
(74) *Attorney, Agent, or Firm*—Dougherty & Clements

(57) ABSTRACT

A system for determining the position of an object, comprising a reference transmitter device (202) disposed in a fixed position, the reference transmitter device (202) having a reference time supplying means for supplying a reference time signal that indicates a reference time, at least two transmitter/receiver devices (302) disposed in fixed positions with respect to each other and to the reference transmitter device (202), each transmitter/receiver device (302) having a time supplying means for supplying a time signal indicating a time, a receiver means for receiving the reference time signal from the reference transmitter device (202) and a synchronization means for processing the time signal and the reference time signal, as well as a position determining device (502) on the object for determining the position of the object.

22 Claims, 7 Drawing Sheets

U.S. PATENT DOCUMENTS

| | | | | |
|---|---|---|---|---|
| 5,646,630 | A * | 7/1997 | Sheynblat et al. | 342/357.14 |
| 5,701,328 | A | 12/1997 | Schuchman et al. | |
| 6,121,928 | A | 9/2000 | Sheynblat et al. | |
| 6,961,562 | B1 * | 11/2005 | Ross | 455/425 |
| 6,963,748 | B1 * | 11/2005 | Chithambaram et al. | 455/456.1 |
| 6,968,194 | B1 * | 11/2005 | Aljadeff et al. | 455/456.1 |

FOREIGN PATENT DOCUMENTS

| | | | |
|---|---|---|---|
| DE | 25 25 446 | C2 | 12/1976 |
| DE | 28 29 558 | A1 | 1/1980 |
| DE | 196 47 098 | A1 | 6/1998 |
| WO | WO 99/48233 | | 9/1999 |

* cited by examiner

SYSTEM FOR DETERMINING THE POSITION OF AN OBJECT

BACKGROUND OF THE INVENTION

1. Field of the Invention

The present invention relates to a system for determining the position of an object, and in particular to a navigation system for indoor and outdoor use.

2. Description of Prior Art

In the field of outdoor navigation, the technical development of navigation systems using satellite signals has made tremendous progress in the last 25 years. Receivers evaluating the American GPS signal (GPS=Global Positioning System) or the Russian GLONASS signal, e.g. in air traffic or automobile engineering, are in worldwide use. In the past few years, there have also been receivers (GNSS=Global Navigation Satellite System) available in the market that combine both systems and thus obtain higher location resolution. The location resolution attainable can be enhanced further by overlay systems, such as WAAS in Northern America or EGNOS in Europe.

The GPS system as an example of an outdoor navigation system comprises a number of partly moving satellites sending out navigation signals. The position of an object is determined in the receiver of the object on the basis of the transit times of the navigation signals to the receivers and on the basis of the known positions of the satellites. This requires time synchronization of the satellites which is obtained by atomic clocks in the individual satellites. The navigation signals are line-of-sight signals the channel model of which is determined only by the ionosphere of the earth, so that the signal powers at the receiver at all times are essentially the same.

A disadvantage of the GPS system resides in that it requires complex transmitters, in this case satellites, for operating the GPS system as a system for determining the position of an object and as navigation system, respectively. In addition thereto, the individual transmitters must each contain very accurate and complex clocks, in this case atomic clocks, in order to achieve the necessary time synchronization of the transmitters.

An additional disadvantage of the GPS system and of satellite-supported systems in general resides in that they cannot be used for highly accurate navigation in indoor applications, e.g. in buildings, or in outdoor applications in areas shaded off from the satellites, e.g. in "ravines" or rows of high buildings.

In the field of indoor navigation, there are presently suggested solutions for position finding solely in the network and not in the terminal device or receiver, with the position of the receiver being determined by means of the transmitter network of the system and—depending on the application—communicated to the receiver or module to be located by wireless communication. As an example in this respect, mobile communication networks offer navigation services that are also suitable for indoor use. Other systems, based on transponder technologies, are used for logistics purposes and for close-range identification. Locating by distance measurements is the method mostly employed here. Locating takes place by transit time measurement of radio, infrared, ultrasonic or laser signals. More accurate systems also make use of modulated signals in order to obtain higher resolution by means of suitable signal processing. Other methods, such as field strength measurement or the evaluation of the received signal angle in case of more complex base stations equipped with phase-controlled antenna arrangements or phased-array antennas, are mostly used in addition to distance measurement.

The current systems for indoor navigation offer either isolated solutions (pico cells) with tags, solutions based on distance measurement and making use of a bidirectional transmission channel, and solutions with combined systems on the basis of mobile communication services.

A disadvantage of the isolated solutions consists in that the network structure is very complex. A disadvantage of solutions based on distance measurements is that the channel capacity is reached very quickly when there are too many modules or receivers to be located simultaneously in the network or system. A disadvantage of solutions using combined systems consists in that both navigation safety is not ensured at all times as the receiver has to receive at least two base stations or transmitters in the building, and also the locating accuracy still is beyond 25 m in outdoor use with satellite systems and beyond 100 m with a communications infrastructure and, thus, is not suitable for example for indoor applications. Most of the systems for indoor applications offer only 1D locating or distance measurement or 2D locating, e.g. in the form of x-y coordinates.

A particular problem of indoor navigation systems, but also of outdoor navigation systems, e.g. in shaded-off building areas, consists in that indoors, e.g. in buildings, there are high signal dynamics and multipath signals, caused e.g. by reflections of the navigation signals inside the buildings. These multipath signals cause very much distortion to the transmission channel and jeopardize reliable locating or determination of the position of an object.

KRAMAR, E., "Funksysteme für Ortung und Navigation", Stuttgart, Berlin, Cologne, Mainz 1973, pages 27, 92 to 104, describes the locating systems Loran-A and Loran-C. Locating in case of the Loran-A system is based mainly on the evaluation of an M pulse emitted by a stationary master transmitter and an S pulse emitted by a stationary slave transmitter. The master transmitter first transmits its M pulse. The slave transmitter transmits its S pulse with an offset in time, which is $t_b+t_c$, with $t_b$ corresponding to the transit time required by the M pulse for covering the distance from the master transmitter to the slave transmitter in order to activate or synchronize the same, and with $t_c$ corresponding to a known, fixedly set delay. The difference in transit time between the M and S pulses is measured at a receiver to be located. Knowing the offset in time between the times of transmission and the fixed positions of the master and slave transmitters on the one hand and the offset in time between the reception times of the M and S pulses on the other hand, it is possible to determine a base line on which the receiver has to be present. For differentiating between various master and slave transmitter pairs, the M pulses and the S pulses of various transmitter pairs are transmitted at different repetition frequencies. The Loran-C system differs from the Loran-A system by the number of S pulses used for locating. Each slave transmitter sends out the S pulse with a different offset in time from the M pulse. In order to make the locating signals of master and slave transmitters distinguishable, Loran-C does not transmit individual pulses but pulse groups differing in number. To render various master and slave transmitter groups distinguishable, the pulses of the pulse groups are phase-coded. In addition to coarse locating, as carried out in Loran-A, phase difference measurement is employed for fine locating. For fine locating, the pulses transmitted are provided with a defined envelope having a precisely defined leading edge, on which a specific measuring point or turning point is fixed which can be located precisely in the receiver to be located by differentiation of the leading edge. By provision of several slave transmitters, the position cannot only be determined to an accuracy of a hyperbolic base line, as in case of the Loran-A system, but to the line of intersection of two or more hyperbolic base lines.

U.S. Pat. No. 3,750,178 describes a position detection system for locating the geographical position of a source of discrete radio frequency signals. The system basically operates in the manner of an inverse Loran system. It has a plurality of spaced radio frequency receiving stations at known geographical locations which receive the radio frequency signals of the source to be located, with the differences in transit time of the radio frequency signal from the source to the individual receiving stations being determined. For synchronizing the receiving stations, there is provided a timing transmitter or Loran transmitter which transmits timing signals in order to start digital stop timing devices of the receiver in synchronized manner. The stop timing devices are stopped when the radio frequency signal of the source is received. The digital stop values are communicated from the receiving stations via transmitters to a computer effecting position determination. For precisely determining the time at which the stop timing devices of the individual receiving stations are stopped, the radio frequency signals received are subjected to specific operations in order to obtain marker pulses rendering possible a more accurate determination of the differences in transit time.

DE 21 37 846 B2 describes a modulation phase comparison hyperbolic method and a means for locating surface-bound vehicles. For position locating, there are employed three receiving stations detecting a measuring signal from a vehicle the location of which is to be determined. Location determination is carried out by a central unit to which the receiving stations transmit the received measuring signal via fixed cables. Knowing the known transit times required by the measuring signals for passage over the lines, the central unit can perform the position determination on the basis of the differences in transit time, said unit to this end having counters and a timer, the counters being stopped upon receiving the earliest arriving measuring signal from one of the transmitters. For compensating transit time fluctuations in the participating evaluation and transmission means, the transit times ascertained in the central unit by means of a timer are supplemented by a correction value in a correction memory. The correction value is obtained intermittently from comparison measurements in which a comparison transmitter in a known position, instead of a vehicle, transmits the measuring signal. For the comparison transmitter, the transit times to the central unit via the receiving stations are known so that the difference between the transit time ascertained by the central unit and the known transit times for the comparison transmitter can be stored as correction values in the correction memory. To permit an unequivocal association of a received measuring signal with a specific vehicle or the comparison transmitter, the central unit comprises an encoder and a radio frequency transmitter in order to request by means of a command signal, either a vehicle to be located or the comparison transmitter to issue a measuring signal in the scope of a request prior to the location determination proper. Any vehicle to be located and the comparison transmitter have a vehicle receiver having a selective call receiver that is responsive to a different command signal.

U.S. Pat. No. 4,494,119 describes a distress radio frequency locating method and system combining direction-finding techniques with calculations based on signal strength in order to locate a distress transmitter. The system comprises a distress transmitter to be located, a plurality of slave repeater units arranged at known locations to receive the distress signal and report their signal strength to a central station, a central station to calculate the location of the distress transmitter based on the measured signal strengths and the known locations of the slave repeater units, and to dispatch a rescue unit, and rescue units equipped with direction finding equipment to approach the distress transmitter. The distress transmitter has a target ID associated therewith, and the slave repeater units each have a unit ID associated therewith, all thereof having corresponding encoders. The distress transmitter transmits the target ID along with its distress signal. The slave units report the received signal strength together with the target ID and the unit ID to the central station which, in turn, has a corresponding decoder.

U.S. Pat. No. 5,208,756 relates to a vehicle locating and navigating system operating in conjunction with a cellular telephone network. For navigation of a vehicle, there are provided a vehicle locating transceiver, a standard cellular telephone and an antenna. Via the antenna, the vehicle locating transceiver receives a dual tone multi-frequency or DTMF signal that is transmitted from telephone stations. Based on the known locations of the telephone stations and the received signal strength, the vehicle locating transceiver determines the location of the vehicle. The location ascertained is transmitted via the base stations externally to a central station where e.g. several vehicles are monitored and navigated.

DE 25 25 446 C2 relates to a locating means with highly constant time standard. The locating means consists of a plurality of receiving stations having receivers tunable to the same frequency and highly constant time standards, e.g. an atomic clock, that can be mutually synchronized. A central station ascertains the differences in transit time between two receiving stations each, as well as the location of a transmitter to be located by way of the point of intersection of the hyperbolic base lines corresponding to the differences in transit time ascertained. To perform on the one hand the evaluation of received signals of a transmitter to be located at the central station by way of cross-correlation between two signals received at different receiving stations while, however, providing on the other hand insensitivity to errors during the transmission from the receiving stations up to arrival at the central station, the signals received are provided with a time reference mark derived from a time standard of the receiving stations and transmitted to a central station performing the cross-correlation.

DE 2829558 A1 relates to a hyperbolic phase comparison method for determining the location of surface-bound vehicles and an apparatus for carrying out this method, and thus constitutes in essence a development of the system according to DE 21 37 846 B2 mentioned hereinbefore. To provide for insensitivity to faults in the transmission of the received signals from the receiving stations to the central unit, each measuring signal received at the receiving stations is compared with a locally produced reference signal from a stationary quartz oscillator, and the phase difference from a reference signal is digitally transmitted to the central unit via a radio channel and analyzed there to form the transit time differences. In certain intervals, locating of a calibration transmitter is carried out the phase difference of which at the receiving stations from the locally produced reference signals is known. On the basis of this, correction values are obtained.

DE-OS 1813128 relates to a system for determining and indicating the respective location of vehicles. The system consists of receivers, a central computer and memory and a main clock. Each receiver comprises a clock that are synchronized with the main clock. Synchronization is carried out via delay circuits that effect delays compensating the differences in transit time of the synchronizing signals from the central main clock to the various local receiver clocks. Upon reception of a signal from the vehicle, the receivers transmit the times from the quartz clocks to the central computer carrying out the analysis using the hyperboloid points of intersection.

DE-PS 1240146 also relates to a method of determining the location of vehicles, which does not only use transmit times for location determination, but in which, in addition thereto, also the distance of the particular vehicle from a plane having the stationary stations therein is ascertained and used as correction. It is possible to use receivers as well as transmitters as stationary or fixed stations. The use of accurate time standards is necessary both on the transmitter side and on the receiving side.

DE 19647098 A1 relates to a location system in general, for multiple dimensional locating of an object on the basis of measured transit time differences of electromagnetically transferred signals. According to a first aspect, there is described a location system in which the object to be located may have a receiving or transmitting unit, while the stationary units may be transmitting or receiving units and in which the stationary units may have inaccurate quartz clocks which, for synchronization to a system time, are connected to a common central timing generator. To avoid distortion of the time synchronization due to signal transit times, the use of signal conductors or cables of defined length is suggested, so that the transmission error arising is known and can thus be compensated. In particular, there is described a location system consisting of transmitters for locating a receiver. Each transmitter is connected, via signal conductors of known length, to a central timing generator, so that the transmitters are synchronized by this one timing generator. The transmitters transmit an electromagnetic wave, the carrier wave thereof having a data stream modulated thereupon that contains a time signal as well as a transmitter-defining code that can be correlated. The receiver has a clock generator of its own in order to obtain a local time standard. The receiver utilizes the encoded electromagnetic signals transmitted by the transmitters in order to obtain therefrom, by means of a computing unit, the positional speed and time information in relation to the time standard of their own.

SUMMARY OF THE INVENTION

The object of the present invention consists in providing a system for determining the position of an object which permits a simple, reliable and accurate determination of the position of an object.

In accordance with an aspect of the present invention this is achieved by a system for determining the position of an object, comprising a reference transmitter device arranged in a fixed position, the reference transmitter device including a reference time supplying means for supplying a reference time signal indicating a reference time, a first signal generator for generating a first information signal containing at least the transmission time of the first information signal that is determined from the reference time signal, and a first transmitter for transmitting the first information signal and/or the reference time signal, the first transmitter including a first code supplying means for supplying a first code associated with the reference transmitter device, a first coder for coding the first information signal with the first code. Moreover, two or more transmitter/receiver devices arranged in fixed positions with respect to each other and to the reference transmitter device are provided, each transmitter/receiver device including a first time supplying means for supplying a first time signal indicating a first time, a first receiver for receiving the reference time signal from the reference transmitter device, a synchronizer for processing the first time signal and the reference time signal and for synchronizing the first time with the reference time in consideration of the transit times of the reference time signal from the reference transmitter device to the transmitter/receiver device, a second signal processor for generating a second information signal containing at least the transmission time of the second information signal that is determined from the first time signal, and a second transmitter for transmitting the second information signal, the second transmitter including a second code supplying means for supplying a second code associated with the transmitter/receiver device and differing from the first code of the reference transmitter device and the second codes of the other transmitter/receiver devices, and a second coder for coding the second information signal with the second code. The object includes a position determining device for determining the position of the object, the position determining device including a second time supplying means for supplying a second time signal indicating a second time, and a second receiver for receiving a reception signal containing the first information signal and the second information signals, the second receiver including a third code supplying means for supplying the first code and the second codes, a decoder for decoding the reception signal using the first code supplied from the third code supplying means and the second codes supplied from the third code supplying means in order to obtain reception information signals corresponding to the first information signal and the second information signals, and a reception time determining means for determining the reception time of each reception information signal with the second time signal of the second time supplying means. The position determining device further comprises a processor for processing the reception information signals, the processing means including an extraction means for extracting the transmission times of the first information signal and the second information signals from the reception information signals, a transit time determining means for determining the transmit times of the first information signal and the second information signals from the reference transmitter device and the transmitter/receiver devices, respectively, to the position determining device on the basis of the transmission times of the first information signal and the second information signals and the reception times of the reception information signals, and a calculator for calculating the position of the object using the transit times of the first information signal and the second information signals and the positions of the reference transmitter device and the transmitter/receiver devices.

An advantage of the present invention consists in that, in case of navigation applications having no or limited visual contact with the transmitters of the system for determining the position of an object, i.e. in indoor applications, such as buildings, or in outdoor applications in shaded-off outdoor regions, e.g. in rows of high buildings, which cogently involve high signal dynamics and multipath signals that highly distort the transmission signal, the invention permits high locating reliability of an object, three-dimensional locating (x, y, z coordinates) as well as locating by a system that is insensitive to interference signals. This is achieved due to the fact that the present invention makes use of a CDMA-based (CDMA=Code Division Multiple Access) system, the CDMA method being less sensitive than known indoor navigation methods to interference by other radio services, such as e.g. mobile communications services, e.g. TDMA- or CDMA-based systems, digital radio broadcasting and satellite services, e.g. in outdoor applications.

The system according to the invention renders possible higher location resolution than in existing CDMA systems. Implemented by means of currently available technologies, the system may reach a location accuracy of less than 1 m. In commercial applications, a possible resolution of about 1 to 5 m is expected for the time being which, however, is theoretically limited only by the wavelength of the carrier frequency employed. In case of an RF carrier frequency of 2.4 GHz in the ISM band, the maximum location resolution may be 6.2 cm (half a wavelength).

Another advantage of the present invention that is due to the use of the CDMA method is the reduced electromagnetic load by the transmitter network as compared to methods measuring signal transit times directly or indirectly (by a frequency sweep of the transmitter) since, due to the amplification gains typical in CDMA systems by unspreading of the signal, transmitters with very low transmitting power support the indoor and outdoor regions, respectively. As CDMA signals are below the noise level, there is no high transmitting power necessary for locating.

An additional advantage of the present invention consists in that the system for determining the position of an object according to the invention does not require a return channel for location and navigation, since locating or determination of the position takes place in the receiver or receiver module, and not in the transmitter network, so that the number of users, application or receiver modules is not limited, there is no risk of network overloading and the radio channel is loaded only with signals generated by the transmitter network. This permits, furthermore, reduced complexity of the base stations or transmitters and the terminal devices or receivers, since the base stations need only one transmitting stage and the terminal devices need only one receiving stage. The receivers may thus be easily integrated in existing systems, such as PDAs or mobile or cellular telephones.

An additional important advantage of the present invention thus is also the downward compatibility with satellite navigation systems so that terminal devices making use of this navigation method may re-use essential parts of the hardware for receipt of CDMA-based satellite-supported outdoor navigation systems, such as GPS, GLONASS, WASS, EGNOS and the future European system GALILEO.

An additional advantage of the present invention consists in the possibility of adjusting the position determination accuracy in application-specific manner and, thus, in varying also the power input of the system as the position is determined in the module.

Another advantage of the present invention consists in that the reach of a transmitter or a base station is within reasonable distances (up to 100 m).

Still another advantage of the invention consists in that additional local information may be included in the transmission to the receiver or may be loaded at reference base stations, such as e.g. current messages or a building plan. By means of an integrated voice encoder, this system may be utilized as an orientation aid for visually handicapped persons.

BRIEF DESCRIPTION OF THE DRAWINGS

Preferred embodiments of the present invention will be described in more detail hereinafter with reference to the attached drawings, in which.

DESCRIPTION OF PREFERRED EMBODIMENTS OF THE INVENTION

The present invention describes a wireless, high-resolution, radio-based and cellular navigation system or system for determining the position of an object, which serves to locate mobile or movable objects, e.g. persons, outdoors and/or indoors. In indoor applications, there may be offered additional information in this system, e.g. a building plan, as orientation aid. Due to the cellular structure, the system described may also be employed for determining the position of an object outdoors or in building complexes, such as fair grounds, consisting of a plurality of buildings.

Figure 1:
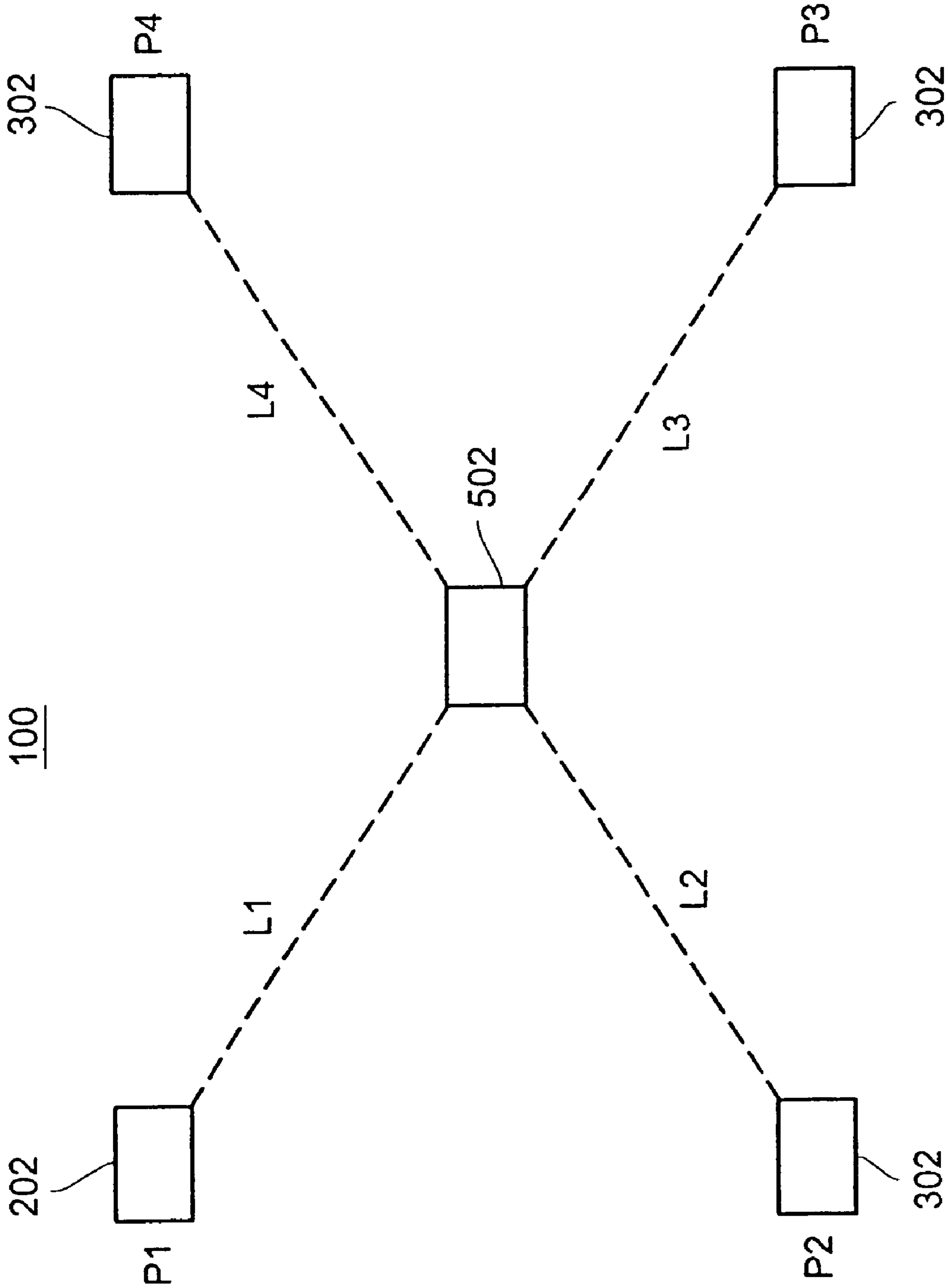
FIG. 1 shows an embodiment of a system for determining the position of an object according to the present invention.

FIG. 1 illustrates an embodiment of a system for determining the position of an object. The system 100 comprises a reference transmitter device 202 arranged in a fixed position, three transmitter/receiver devices or transceiver devices 302 arranged in fixed positions relative to each other and to the reference transmitter device 202, and a position determining device 502 for determining the position of the object, with the object comprising the position determining device 502. In order to determine the position of the object comprising the position determining device 502 in a two-dimensional system, the system 100 has to have at least three transmitter devices, for example one reference transmitter device 202 and two transmitter/receiver devices 302. In order to determine a position of the object comprising the position determining device 502 in a three-dimensional system or in space, the system 100 has to have at least four transmitter devices, for example one reference transmitter device 202 and three transmitter/receiver devices 302, as shown in FIG. 1.

For three-dimensional determination of the position of the object comprising the position determining device 502, the positions P1, P2, P3 and P4 of the transmitter devices 202, 302 and the transit times L1, L2, L3 and L4 of navigation signals or information signals from the transmitter devices 202, 302 to the position determining device 502 are required. To this end, the transmitter devices 202, 302 have to operate in time-synchronized manner, i.e. their clocks must operate synchronously. The transit times L1, L2, L3 and L4 of the information signals are determined on the basis of the difference of the reception times of the information signals at the position determining device 502 and the transmitting times of the information signals from the transmitter devices 202, 302. As the transmitter devices 202, 302 operate in time-synchronized manner, the position determining device 502 itself does not need an exact time base or an exact clock of its own. The position determining device 502 just requires a timer or a time supplying means that is capable of relatively measuring intervals in time in specific time domains.

For two-dimensional (and three-dimensional, respectively) position determination, i.e. for determining the position of a object in a plane (or in space, respectively), there are required three (respectively four) transmitters or transmitter devices 202, 302. In case of two-dimensional position determination, however, the third transmitter or in the instant case, a second transmitter/receiver device 302 could be dispensed with, although the circles made around the remaining two transmitters, i.e. the reference transmitter device 202 and the remaining transmitter/receiver device 302, have two points of intersection with the radius of the transit time of the navigation signals, so that the position determination of the object is not unequivocal. This is due to the fact that the proper point of intersection or the correct position of the object can also be determined via the phase, without a third transmitter device 202, 302. The third transmitter device, however, is necessary in two-dimensional position determination in order to determine the actual reception time of the information signals in the receiver or position determining device 502, so as to be able to correctly calculate the transit times of the information signals to the position determining device 502. Thus, the position determining device 502 merely requires a time supplying means, e.g. a clock, that is not time-synchronized exactly with the transmitter devices 202, 302 and may be synchronized with the transmitter devices 202, 302 via the information of the additional transmitter device. The situation is similar for the three-dimensional case. Here too, there would be no fourth transmitter device necessary, as determination of the position is possible in accordance with the phase. However, the fourth transmitter device 202, 302 and the third transmitter/receiver device 302 in FIG. 1, respectively, serve for an exact determination of the reception time of the information signals within the position determining device 502.

The time synchronization in the network of the transmitter devices 202, 302 of FIG. 1 is performed in two steps. Upon switching-on of the infrastructure, synchronization in the network is established by programmable delays or time correction values, and during operation this time synchronization is examined and corrected, respectively, at regular intervals. Synchronization of the transmitter devices 202, 302 is obtained via a connection between the same, via which the devices are in communication with each other. In this respect, e.g. the reference transmitter device 202 supplies a reference time in the form of a reference time signal, with which the transmitter/receiver devices 302 synchronize in time via said connection. This connection may be wire-bound or cable-bound, e.g. via electrical or optical cables, or may be of wireless type. The wire-bound connection is preferred, as the transmissions of reference time signals from the fixedly positioned reference transmitter device 202 to the fixedly positioned transmitter/receiver devices 302 are direct and have known transit times over the connection that need to be considered in synchronizing the clocks. In contrast thereto, the wireless communication requires line-of-sight signals for being able to synchronize the clocks; in this case, there may occur multipath signals beside the line-of-sight signals, i.e. for example reflections of the reference time signal of the reference transmitter device 202 on walls on the path to the particular transmitter/receiver device 302, which aggravate the determination of the transit times of the reference time signal to the transmitter/receiver devices 302. Both in wire-bound and in wireless transmission of reference time signals, the clocks or time supplying means of the transmitter/receiver devices 302 are synchronized with the clock or a reference time supplying means of the reference transmitter device 202 supplying the reference time signal.

The system 100 of FIG. 1 may also have solely transmitter/receiver devices 302 as transmitter devices 202, 302, with one of the transmitter/receiver devices 302 being determined to be a reference transmitter/receiver device or reference transmitter device, in accordance with the structure and the environment of the system. For example, such a determination may be dependent on that one transmitter/receiver device 302 of the plurality of transmitter/receiver devices 302 has the most exact clock and thus may be the supplier of a reference time to which all other transmitter/receiver devices 302 may be synchronized.

In addition thereto, each system 100 may have a very large number of transmitter devices 202, 302 which e.g. are exclusively transmitter/receiver devices. This large number of transmitter devices may be distributed to very many subgroups, such as buildings in a building complex, rooms within a building etc., as e.g. the reach of the transmitter devices is limited, with the system possibly having hierarchical structures formed therein. Each subgroup, e.g. a room, in turn may have a hierarchical structure of transmitter devices of its own formed therein, in which a transmitter device can be determined to be a reference transmitter device or reference transmitter/receiver device to which all other transmitter devices of the subgroup are synchronized since this reference transmitter device has, for example, the most accurate clock or is itself synchronized with a transmitter device of a superior group. A superior group, e.g. a floor or a building, may have subgroups of its own, e.g. rooms, that synchronize with a selected reference transmitter device, e.g. of the floor or of the building, etc.

Figure 2:
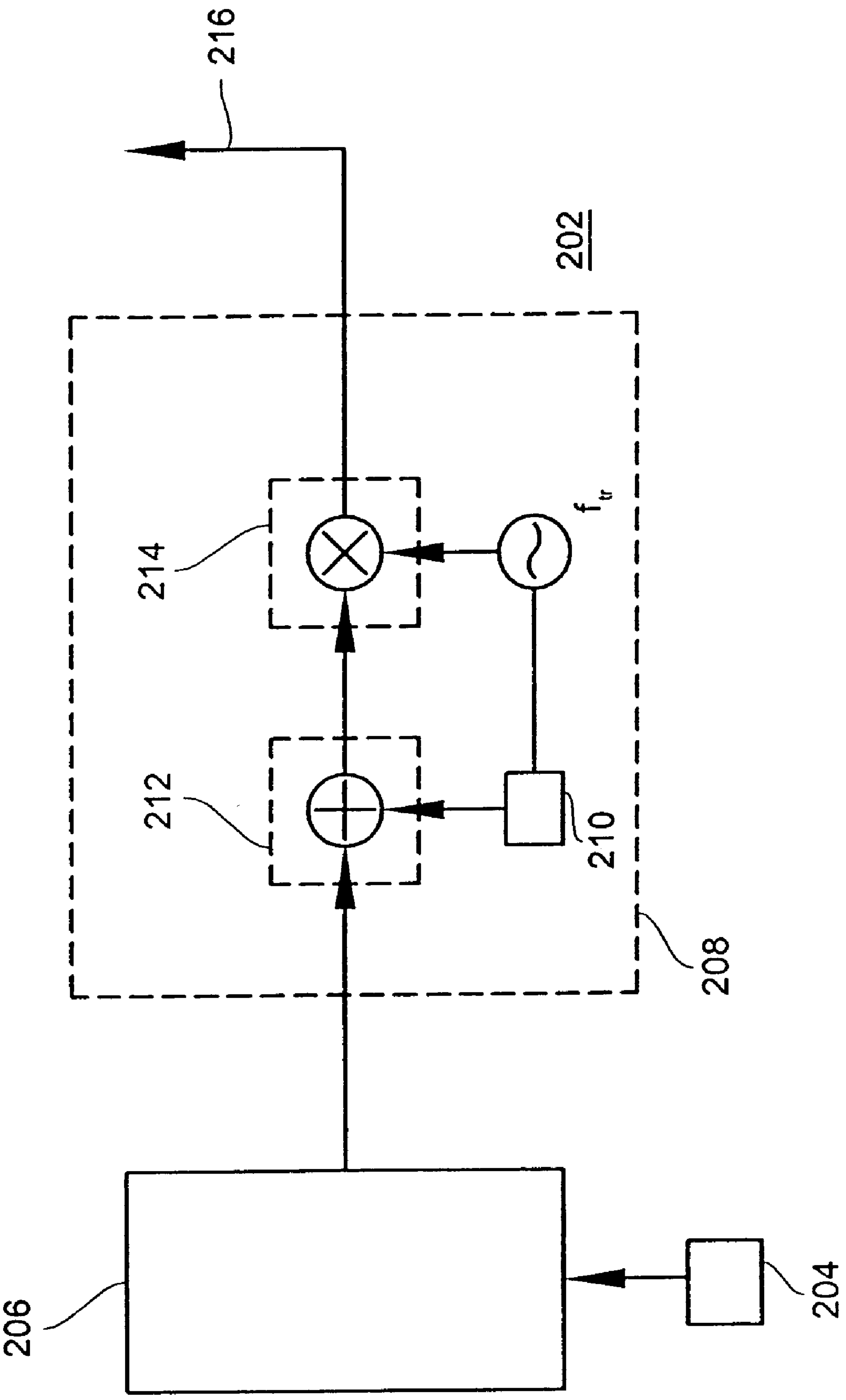
FIG. 2 shows an embodiment of a reference transmitter device of the system according to the present invention as shown in FIG. 1.

FIG. 2 illustrates an embodiment of a reference transmitter device of the system according to the present invention as shown in FIG. 1. The reference transmitter device 202 comprises a reference time supplying means 204 for supplying a reference time signal indicating a first reference time, a signal generating means 206 for generating an information signal or navigation signal including the transmission time of the information signal that is determined on the basis of the reference time signal, as well as a transmitter means 208 for transmitting the information signal and/or the reference time signal.

The reference time supplying means 202 preferably is a timer or a clock etc., supplying a time base for determining a time or a moment of time, in the instant case the reference time. The signal generating means 206 preferably is an analog or digital signal generating means, e.g. a processing means that generates an information signal which among other things contains the transmission time of the information signal itself. Furthermore, the signal generating means 206 can be arranged to generate an information signal which in addition includes the position of the reference transmitter device 202, local information for the range of the network of the reference transmitter device 202 and the transmitter/receiver devices 302 or for the range containing the object of the position determining device 502, local messages, specific system parameters, synchronization data, a map of the surroundings or a building plan and/or directories of reference transmitter devices 202 and/or radio beacons.

The transmitter means 208 of the reference transmitter device 202 preferably comprises a code supplying means 210 for supplying a code associated with the reference transmitter device 202, as well as a coding means 212 for coding the information signal with the code of the code supplying means 210. The code supplying means 210 preferably is a memory containing a continuous (analog) or value-discrete (digital) signal representing the code. In this regard, a noise-like signal or a pseudo noise code (PN code) is preferred that can be regenerated both in the transmitter devices 202, 302 and in the position determining devices 502 in mutually independent manner. These codes include, among others, the codes of maximum length (m sequences). Other possible codes are the Gold sequences, for example.

The coding means 212 of the transmitter means 208 preferably is a synchronous operation or EXCLUSIVE-OR means that adds the code to the information signal, thereby effecting band-spreading of the information signal. Due to the use of pseudo noise signals or codes, uniform distribution of the signal power of the information signal across the spread frequency band is achieved. For recovering the information signal, for example, in the position determining means 502, this information signal is correlated with the code used for spreading. To this end, the code generated in the reference transmitter device 202 is synchronized to the receiving code in phase-correct manner and multiplied by the reception signal. The information signal then is decorrelated to the original bandwidth. Interference superimposed on the signal is spread spectrally and reduced in its amplitude in accordance with the bandwidth ratio, e.g. by subsequent signal integration or low-pass filtering.

The transmitter means 208 of the reference transmitter device 202 may comprise, furthermore, a modulation means 214 for modulating the information signal and/or the reference time signal onto a carrier signal having a carrier frequency $f_{TR}$. The modulation means 214 preferably is a mixing means or multiplication means modulating the information signal onto the carrier signal, the carrier signal preferably being a radio frequency carrier signal. The modulation means 214 preferably performs phase shift keying modulation (PSK modulation or BPSK modulation) for modulating the information signal onto the carrier signal. However, other known modulation methods may be used as well.

If an RF carrier signal is used, for example, the reference transmitter device 202 may have an antenna 216 which can be used among other things for transmitting the RF signal.

Figure 3:
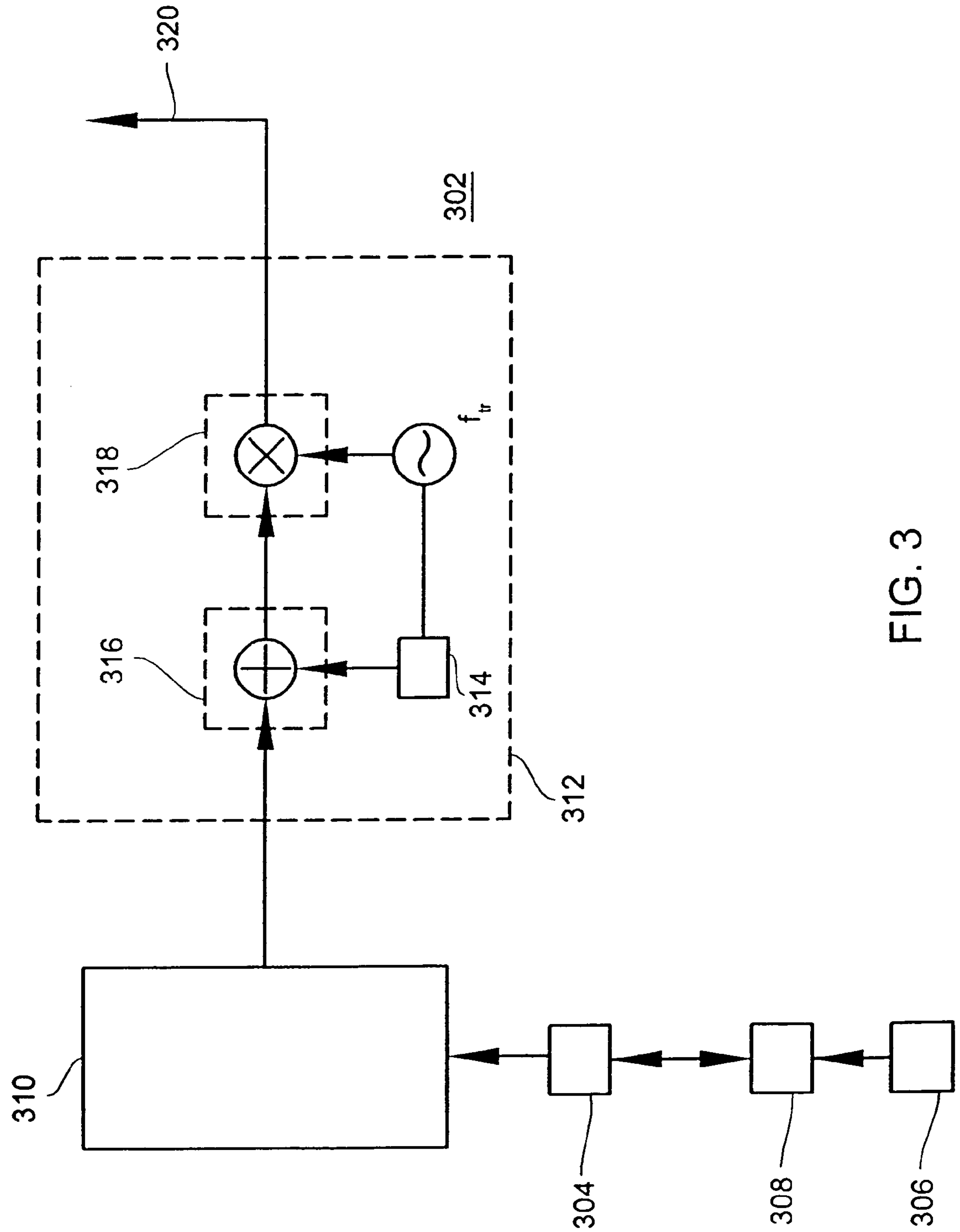
FIG. 3 shows an embodiment of a transmitter/receiver device of the system according to the present invention as shown in FIG. 1.

FIG. 3 shows an embodiment of a transmitter/receiver device of the system according to the present invention as shown in FIG. 1. The transmitter/receiver device 302 preferably comprises a time supplying means 304 for supplying a time signal indicating a time, a receiving means 306 for receiving the reference time signal from the reference transmitter device 202 or for receiving a time signal from another transmitter/receiver device as reference time signal, a synchronization means 308 for processing the time signal and the reference time signal and for synchronizing the time of the transmitter/receiver device 302 with the reference time, a signal generating means 310 for generating an information signal including the transmission time of the information signal that is determined on the basis of the time signal, as well as a transmitter means 312 for transmitting the information signal.

As pointed out hereinbefore, the system of the transmitter devices 202, 302 according to FIG. 1 also may consist of transmitter/receiver devices 302 only, and in accordance with the structure of the system one or more transmitter/receiver devices 302 can be determined to be reference transmitter devices and reference transmitter/receiver devices, respectively. The time signal supplied from the time supplying means 304 then is the reference time signal with which the other transmitter/receiver devices 302 are synchronized. Such a structure provides for more flexibility of the system in accordance with the external conditions of the system and for higher reliability, e.g. when a transmitter/receiver device fails as reference transmitter/receiver device. The receiver means 306 and the synchronization means 308 are not superfluous, either, in a transmitter/receiver device 302 determined to be a reference transmitter device, since the same in turn may synchronize itself with a superior transmitter/receiver device 302 that is also a reference transmitter device, for example of a superior group. This renders possible a hierarchical structure.

Returning to FIG. 3, the time supplying means 304 preferably is a timer or a clock etc. supplying a time base for determining a time or a moment of time, in this case the time of the clock.

The receiver means 306 preferably is a means for processing the reference time signal from the reference transmitter device 202 processing the reference time signal arriving via a connection. The receiver means 306 can be matched for processing a reference time signal communicated via a wire-bound or a wireless connection.

The synchronization means 308 of the transmitter/receiver device 302 preferably has a time correction means for correcting the time signal or the time of the time supplying means 304 with the aid of a delay or a time correction value representing the difference in time between the reference time of the reference time supplying means 204 of the reference transmitter device 202 and the time of the time supplying means 304 of the transmitter/receiver device 302. This time correction value may be, for example, a correction field that is measured upon installation of the system and is newly determined in intervals of time. Thus, in case of a simple transmitter network, the reference transmitter device 202 does not necessarily have to communicate with the transmitter/receiver devices 302 at all times. In case of a more complex system, in which the transmitter/receiver devices 302 synchronize with the reference transmitter device 202, a regular time matching possibility between the reference transmitter device 202 and the transmitter/receiver devices 302 can be provided for.

The signal generating means 310 for generating the information signal preferably is an analog or digital processing means, e.g. a processing means generating an information signal including the transmission time of the information signal. The signal generating means 310 furthermore may be arranged to generate an information signal including furthermore the position of the transmitter/receiver device 302. The information signal, moreover, may comprise local information for the region of the network of the reference transmitter device 202 and the transmitter/receiver devices 302, or for the region in which the object of the position determining device 502 is present or moving, local messages, specific system parameters, synchronization data, a map of the surroundings and a building plan and/or directories of reference transmitter devices 202 and/or radio beacons.

The transmitter means 312 of the transmitter/receiver device 302 preferably has a code supplying means 314 for supplying a code that is associated with the transmitter/receiver device 302 and differs from the codes of the other transmitter devices 202, 302, as well as a coding means 316 for coding the information signal with the code.

The code supplying means 314 of the transmitter means 312 preferably is a memory containing an analog or a digital code signal representing the code. This code preferably is a pseudo noise code that can be regenerated both in the respective transmitter/receiver device 302 and in the position determining device 502 in mutually independent manner. Pseudo noise codes include so-called codes of maximum length (m sequences). Other possible cods are, for example, the Gold sequences.

The coding means 316 of the transmitter means 312 preferably is a synchronous operation or EXCLUSIVE-OR means that adds, or combines, the code of the code supplying means 314 to the information signal of the transmitter/receiver device 302. By multiplication of the information signal with the code, the information signal is spread and uniform distribution of the signal power across the spread frequency band is achieved. For recovering the spread information signal, this information signal is correlated with the code used for spreading in the position determining device 502. To this end, the code generated in the reference transmitter/receiver device 302 is synchronized with the reception code in phase-correct manner and multiplied by the reception signal. The spread reception information signal then is decorrelated to the original bandwidth. Interference superimposed on the signal is, in contrast, spread spectrally and may be reduced in its amplitude in accordance with the bandwidth ratio, e.g. by subsequent signal integration or low-pass filtering.

The transmitter means 312 of the transmitter/receiver device 302 may comprise, furthermore, a modulation means 318 for modulating the information signal onto a carrier signal having a carrier frequency $f_{TR}$ which preferably is equal to the carrier frequency of the reference transmitter device 202. The modulation means 318 preferably is a mixing means and multiplication means modulating the information signal onto the carrier signal, the carrier signal preferably being a radio frequency carrier signal (RF carrier signal). The modulation means 318 preferably can perform phase shift keying modulation (PSK modulation or BPSK modulation) for modulating the information signal onto the carrier signal. However, other known modulation methods may be used as well.

The transmitter/receiver device preferably has an antenna 320 in addition which can be used among other things for transmitting the RF carrier signal.

Figure 4:
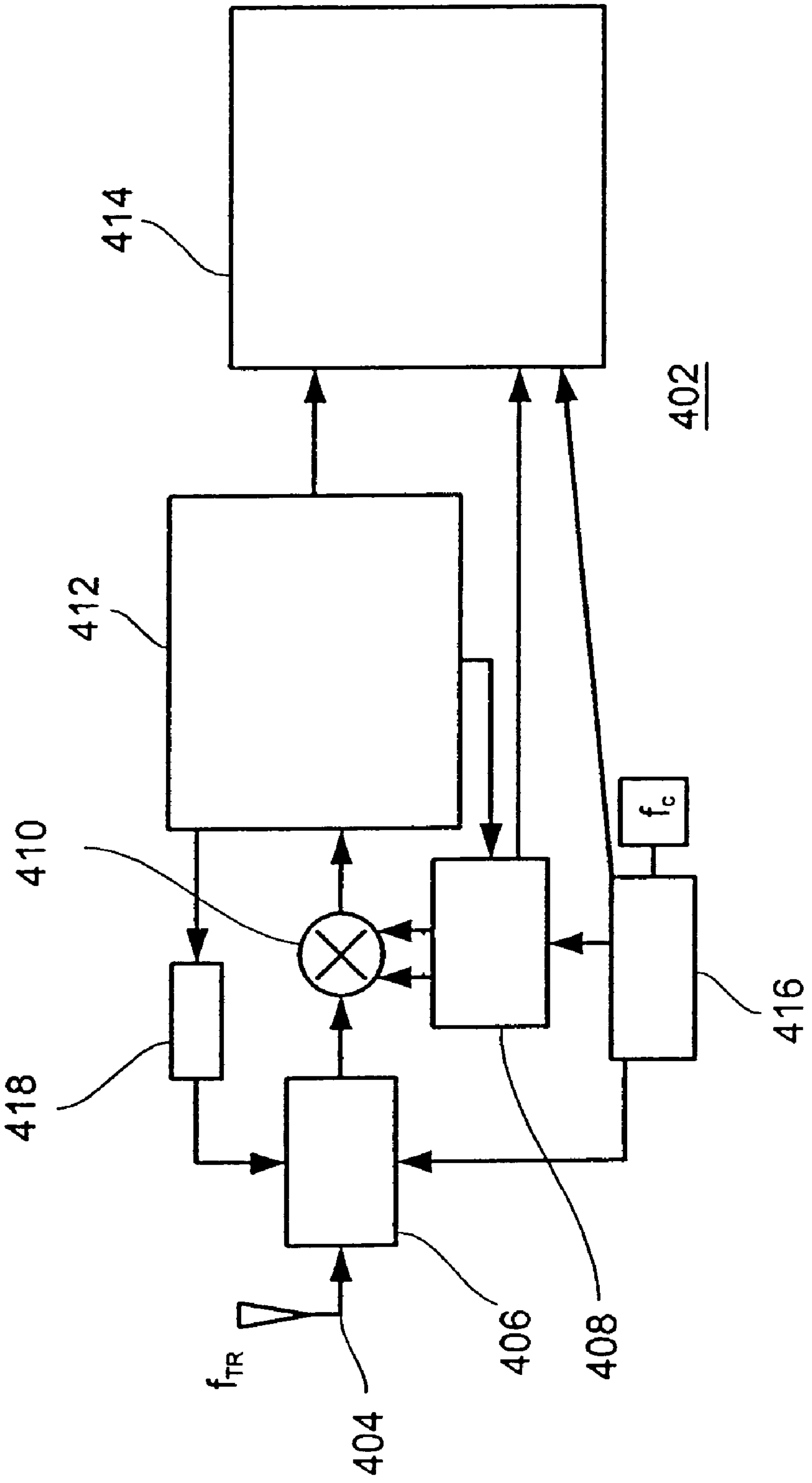
FIG. 4 shows a general representation of a position determining device of the system according to the present invention as shown in FIG. 1.

FIG. 4 shows a general representation of a position determining device of the system according to the present invention as shown in FIG. 1. The position determining device 402 comprises an antenna 404 for receiving the information signal, e.g. the RF information signals, of the transmitter devices 202, 302 as an (RF) reception signal. This reception signal is passed on from the antenna 404 to a radio frontend 406 or radio input stage. This radio frontend 406 comprises, for example, a mixing means mixing the radio frequency reception signal into the baseband. Such mixing can be realized in analog or analog/digital form using an intermediate frequency sampling device or IF sampler. Further processing then takes place digitally. In the baseband, the reception signal is correlated with a defined number of codes, each of these codes being associated with a transmitter device 202, 302 (FIG. 1). These codes are generated in a code generator 408 in accordance with the codes of the transmitter devices. For each code, the reception signal is correlated with one or more correlators in a correlation section 410 and a first processing section 412 in order to obtain discrete reception information signals, that are associated with the information signals of the transmitter devices, from the reception signal by correlation. The reception signal correlated with the individual codes in the correlation section 410 is fed into the first processing section 412 of the position determining device 402, in which final correlation of the codes with the reception signal and derivation of the associated reception information signals take place. To this end, multipath signals caused by the reflection of the information signals transmitted by the transmitter devices 202, 302, e.g. from walls, must be separated from the line-of-sigh signals in order to obtain for each transmitter device 202, 302 the information signal that has propagated on a direct path to the position determining device. Only this signal permits a correct transit time determination of the respective information signal and location determination of the object. The first processing section 412 of the position determining device 402, furthermore, provides for code control of the code generator 408 in order to control the correlation of the code with the reception signal in the correlation section 410, and moreover controls, via an automatic gain control (ACG) 418, the amplification or gain of the reception signal which, depending on the nature of the environment of the position determining device 402, i.e. mainly on the occurrence of multipath signals and interference, is of different magnitude and has high dynamics. The reception information signals received are passed on to a second processing section 414 of the position determining device 402, which tracks the respective reception information signal without the multipath signals, and time-synchronizes the same with the other reception information signals and decodes the same in order to obtain from the respective reception information signals, apart from additional information, the transmission times of the information signals associated with the reception information signals and, preferably, also the positions of the transmitter devices 202, 302 in order to thus determine the position of the object at the particular moment of time. The second processing section 414 of the position determining means 402 moreover provides for the navigation of the object, by issuing navigation instructions, navigation signals etc. from the second processing section 414, and may be a digital signal processor, for example. The code generator 408 communicates with the second processing section 414 in order to be able to identify the reception information signals associated with the respective code. The position determining device 402 comprises furthermore a synthesizer or frequency generator 416 having a frequency $f_c$, which takes over the time control of the radio frontend 406, the code generator 408 and of the second processing section 414 of the position determining device 402.

The propagation of multipath signals that are reflections of the information signals of the transmitter device 202, 302 e.g. indoors on inner walls or in shaded-off outdoor regions on outer walls of buildings, and the signal dynamics of the reception signal of the position determining device 402 that is composed of the discrete reception information signals, said signal dynamics being due to the different amplitude of the reception signal, e.g. owing to reflections, different environmental conditions as regards attenuation etc., make utmost demands on the position determining device. Due to the different structure of indoor areas or rooms, it is as a rule very difficult to define the propagation conditions of the information signals in general. The information signals are attenuated differently by the distance, by flat fading, fixed and time-variable hindrances. The attenuation may be up to 80 dB. Multipath propagation thus is marked by very high differences in dynamics. The high dynamics requirements are met in the position determining device 402 by the control loop (AGC) 418 controlled by the first processing section 412 and by the use of an AD converter having a resolution of approx. 10 bits and a sampling rate the period duration of which is less than the transit time differences to be resolved. The multipath signals are then separated using a matching decision means.

It is to be noted that the navigation data and information data have a very low data rate ($f_{INF}$). To ensure sufficient processing gain, the data rate of the information data $f_{INF}$, however, has to be clearly lower than the bandwidth of the information signal. The information signal then is modulated directly onto the carrier frequency ($f_{TR}$) in phase-locked manner. In order to be able to efficiently utilize the transmission channel of the information signal, PSK modulation techniques, such as the BPSK modulation technique, are particularly suitable.

Figure 5:
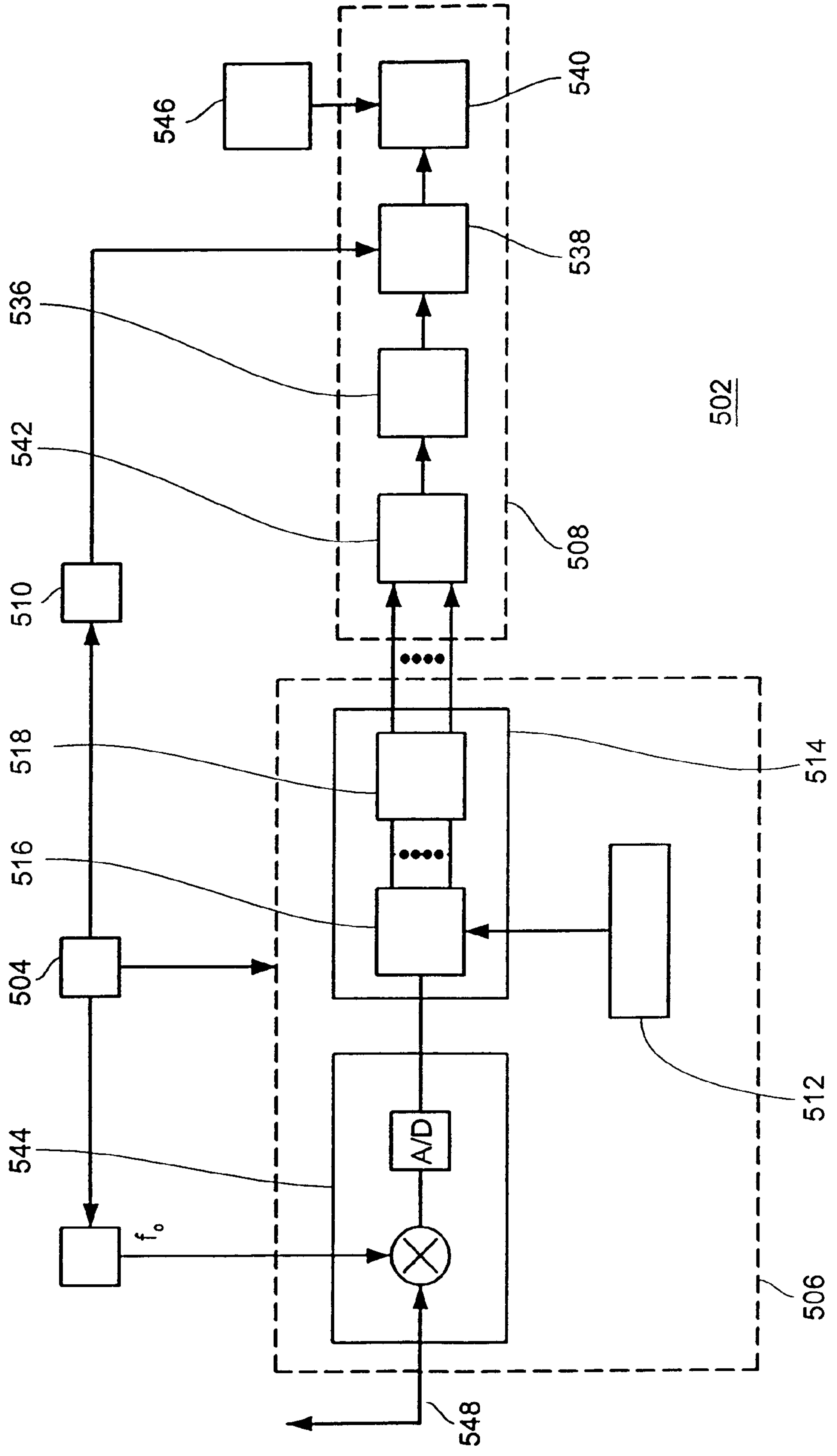
FIG. 5 shows an embodiment of a position determining device of the system according to the present invention as shown in FIG. 1.

FIG. 5 shows an embodiment of a position determining device 502 of the system according to the present invention as shown in FIG. 1. The position determining device 502 preferably comprises a time supplying means 502 for supplying a time signal indicating a time, a receiving means 506 for receiving a reception signal including the reception information signals of the transmitter devices 202, 302, a processing means 508 for processing the reception information signals and a reception time determining means 510 for determining the reception time of each reception information signal by means of the time signal of the time supplying means 504.

The time supplying means 504 preferably is a timer or a clock etc. supplying a time base for determining a time or moment of time.

The receiving means 506 of the position determining device 502 preferably comprises a code supplying means 512 for supplying the codes of the transmitter devices 202, 302 and a decoding means 514 for decoding the reception signal using the codes of the transmitter devices 202, 302 supplied by the code supplying means 512, in order to obtain, from the reception signal, reception information signals corresponding to the information signals of the transmitter devices 202, 302.

The code supplying means 512 of the receiving means 506 is preferably a memory containing analog or digital code signals representing the codes of the transmitter devices 202, 302, the codes preferably being pseudo noise codes (PN codes). These include the so-called codes of maximum length (m sequences) or other possible codes, such as Gold sequences.

The decoding means 514 of the receiver means 506 comprises for each transmitter device 202, 302 of the system 100 preferably at least one correlation means 516 for correlating the reception signal with the code associated with the respective transmitter device 202, 302 and available in the code supplying means 512 in order to obtain a correlated reception signal, and one integration means 518 associated with each correlation means 516 and integrating each correlation result of the correlation of the reception signal with each associated code over a time corresponding preferably to a period of a code sequence, so as to obtain a reception information signal associated with the respective transmitter device 202, 302.

In the correlation means 516, the reception signal is shifted by one clock each and then is correlated in parallel with each code in the code supplying means 512. This code supplying means 512 contains each code associated with a transmitter device 202, 302 in an associated shift register, the code being shifted therein at a fast clock rate that is greater than the chipping rate. In case of synchronization of the input signal with the respective contents of a shift register, a correlation peak is created at the output of the integration means 518.

For the receiver means 506, each transmitter device 202, 302 is a satellite, irrespective of whether only transmitter/receiver devices 302 or also reference transmitter devices 202 are used in the network. For 3D locating, four different signals have to be considered, and for 2D locating, only three different signals have to be considered in the evaluation in the receiver means, irrespective of the respective transmitter device 202, 302. This means that preferably more than four or three, respectively, correlation means 516 and associated integration means 518 should be provided in order to be able to decode four or, respectively, three signals from different transmitter devices 202, 302 in the reception signal with higher safety. For each transmitter device 202, 302 to be received, there thus needs to be provided at least one correlation means 516 and an associated integration means 518 in the decoding means 514. For faster correlation, there may also be provided more than one correlation means 516 and integration means 518 per transmitter device 202, 302.

Figure 6:
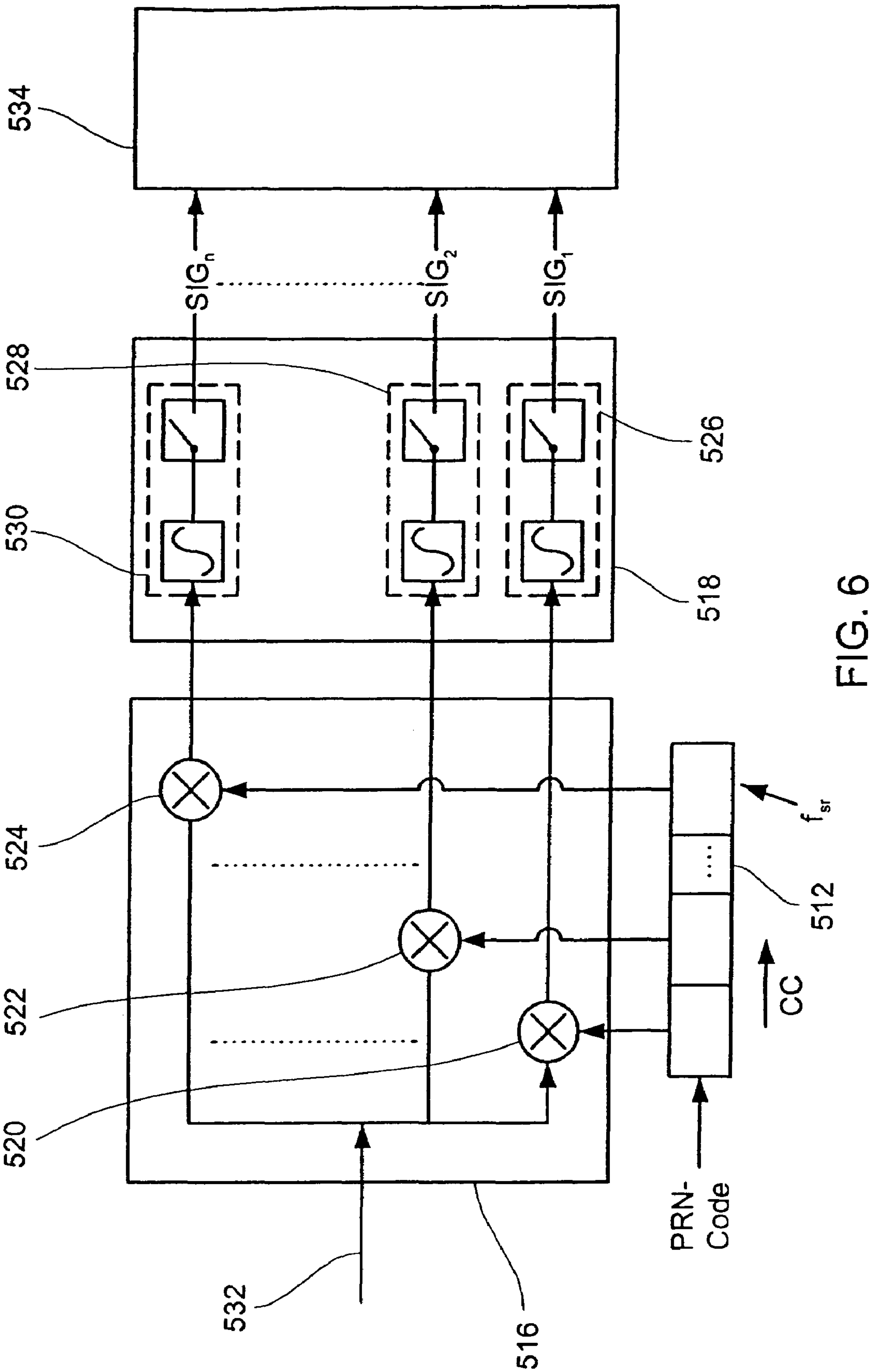
FIG. 6 shows an embodiment of a correlation means and an integration means of the position determining device of FIG. 5.

FIG. 6 shows an embodiment of the correlation means 516 and of the integration means 518 of the decoding means 514 of FIG. 5. Each correlation means 516 associated with a code or a transmitter device 202, 302 comprises a correlator 520 for correlating the code with the reception signal so as to obtain a correlated reception signal, and each integration means 518 associated with a code or a transmitter device 202, 302 comprises an integrator 526 associated with the correlator 520, for integrating the correlated reception signal of the correlator 520 over time, so as to obtain the reception information signal associated with the code or the transmitter device 202, 302. Each correlation means 516 associated with a transmitter device 202, 302 comprises furthermore an additional correlator 522 for correlating the time-shifted code with the reception signal in order to obtain a correlated reception signal, and each integration means 518 associated with a transmitter device 202, 302 comprises furthermore an integrator 528 associated with said additional correlator 522 for integrating the correlated reception signal over time, so as to obtain a time-shifted code-associated reception information signal or multipath signal that is different from the reception information signals which reached the position determining device 502 on a direct path. Each correlation means 516 has at least three, and preferably more than three, additional correlators 522, . . . , 524 and at least three, preferably more than three, additional integrators 528, . . . , 530 in the integration means 518 which are associated with said additional correlators 522, . . . , 524. Increasing the number of correlators and the associated integrators permits finer resolution of the edges and possible secondary maxima of the correlation peak. Secondary maxima occur upon reception of multipath signals or in multipath reception. The embodiment in FIG. 6 thus permits a determination of the line-of-sight signal and of multipath signals plotted in relation to time in FIG. 7.

The number of correlators and the number of associated integrators, respectively, differently from e.g. the GPS system (Early, Present, Late: EPL structure), is not fixedly defined and is dependent on the period of time in which the system is to recognize and decode the multipath signals, or in other words is strongly dependent upon the properties of the environment in which the system is to be employed, e.g. buildings or rooms. The number of correlators may become very high, depending on the particular environment or building. It is also conceivable that a different number of correlators is required or used for each room of each discrete building and that this number is delivered as system parameter to the navigation terminal device as variable upon entering of the building, via radio beacons, radio, manual input etc. The terminal device then automatically adjusts the correct configuration via software etc. The number of required or utilized correlators may thus be variable.

The code supplying means 512 has for each associated code one shift register with nr bits each, which realizes the time shift of the code. In the shift register 512 having a width of nr bits, the code is shifted by one increment of the chip length (CC) each, with a clock rate ($f_{sr}$). After correlation of the reception signal with the contents of the shift register 508, the correlated reception signal is integrated in the integration means 528. The length of the shift register (nr) or the number of correlators and associated integrators and the clock rate ($f_{sr}$) define the period of time in which the multipath signals can be decoded separately from each other, as well as the resolution with which this can take place. A location resolution with an accuracy of half a wavelength of the carrier frequency may be effected on condition that the carrier frequency is synchronized with the chipping rate. The information of the phase position of the carrier signal is thus retained, despite downward mixing, sampling and processing. At each correlator 520, . . . , 524 of the correlation means 516, there is applied, for example, a baseband signal 532 in bitwise manner to the input of the respective correlator 520, . . . , 524, and the code of the respective transmitter device 202, 302 is shifted (correlated) across the signal at the clock rate $f_{sr}$ in order to thus obtain the "tips" or heights of the correlation peaks of the information signal and the associated multipath signals. These correlation results are illustrated in FIG. 6 as $SIG_1$, $SIG_2$, . . . , $SIG_N$. In the digital processing means 534 following the integration means 518, tracking of the signal takes place in order to find the peak of the line-of-sight signal. It is to be noted that the information signal need not necessarily have the strongest or highest peak.

Figure 7:
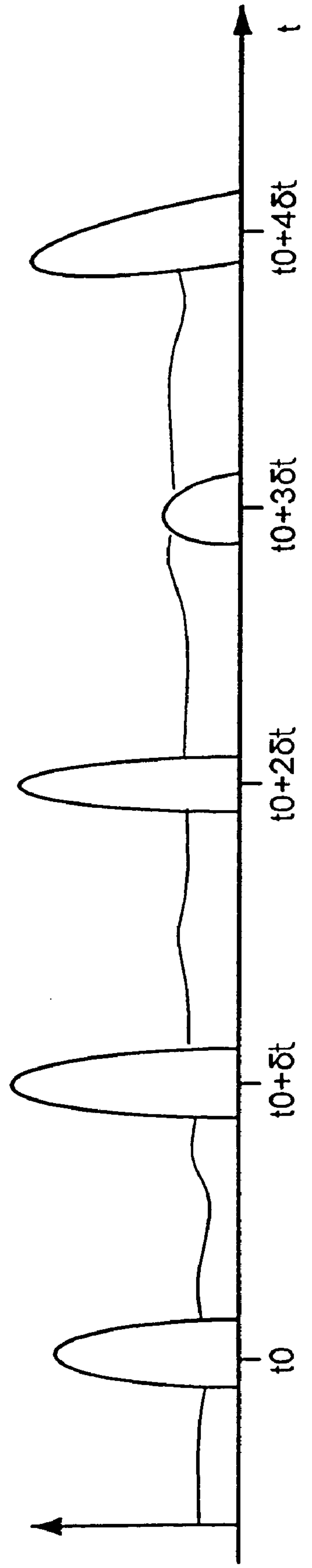
FIG. 7 shows an output signal of the integration means of FIG. 6.

FIG. 7 illustrates the course in time after integration by the integration means 518, said course having the individual peaks of a reception information signal and its multipath signals. FIG. 7 illustrates the reception information signal at t0 and the multipath signals at t0+□t, t0+2□t, t0+3□t and t0+4□t. These peaks result from the correlation of the reception signal with the associated code of a transmitter device, thereby effecting unspreading of the reception information signal and the multipath signals, respectively, so that a peak is generated that projects from the respective noise that is shown in FIG. 7 as well. The minimum distance in time □ between the correlation peaks permitting resolution corresponds to the period length of the clock signal used for operating an analog to digital converter.

Returning to FIG. 5, the reception time determining means 510 of the position determining device 502 preferably comprises, furthermore, a means determining a reception time of the reception information signal from the time signal of the time supplying means 504 and the event of detection of the reception information signal in the reception signal.

The processing means 508 of the position determining device 502 preferably comprises an extraction means 536 for extracting the transmission times of the information signals of the transmitter devices 202, 302 from the reception information signals, a transit time determining means 538 for determining the transit times of the information signals from the transmitter devices 202, 302 to the position determining device 502 on the basis of the transmission times of the information signals and the reception times of the reception information signals, as well as a calculating means 540 for calculating the position of the object using the transit times of the information signals and the positions of the transmitter devices 202, 302.

The extraction means 536 for extracting the transmission times of the information signals preferably has a processing means extracting the transmission times of the information signals from the information signals. When the information signals contain additional information, such as the positions of the transmitter devices 202, 302, the processing means furthermore is arranged to gather such information from the respective information signal.

The transit time determining means 538 for determining the transit times of the information signals preferably has a processing means determining the difference of the transmission time of an information signal from the reception time of an information signal or of the reception information signal. As mentioned, it is of no relevance in this respect whether the time supplying means 504 of the position determining device 502 is synchronized with the time supplying means 204, 304 of the transmitter devices 202, 302, as it is sufficient that the internal time supplying means 504 of the position determining device 502 indicates an exact reception time of the reception information signals within a specific range. The time synchronization of the reception time of the reception information signals with the time supplying means 204, 304 of the transmitter devices 202, 302 is obtained, in terms of calculation, for example by means of an equation system supplied to the calculating means 540, in which, e.g. in three-dimensional position determination, the fourth transmitter device 202, 302 renders possible the determination of the exact reception time from the equation system by a fourth condition.

The calculating means 540 of the processing means 508 preferably has a processing means arranged to establish and solve, for example, an equation system of the transit times L1, L2, L3 and L4 of the information signals and the known positions P1, P2, P3 and P4 (FIG. 1) of the transmitter device 202, 302.

The processing means 508 preferably comprises, furthermore, a multipath signal filtering and data recovering means 542 for extracting the reception information signals and for demodulating and decoding the reception information signals, respectively, in order to synchronize on a reception information format or navigation data format and, if necessary, to pass the information data on to the extraction means 536. The synchronization is optionally saved and retained, and the data are passed on for decoding. At the input of the multipath signal filtering and data recovering means 542, there are applied data values $SIG_1$, $SIG_2$, . . . , $SIG_N$ (FIG. 6) from the integration means 518, and for each code of a transmitter device 202, 302, the correlation peaks of multipath signals are recognized in parallel. The proper signal is selected for further data processing and passed on for evaluation. For each code, the signals are examined with respect to synchronization thereof, and the information data are extracted, if necessary.

The receiver means 506 of the position determining device 502 comprises, furthermore, preferably a mixing means 544 for mixing the reception signal having the reception information signals of the transmitter devices 202, 302, which are modulated on the carrier signal, into an intermediate signal or the baseband, respectively. An analog to digital converter supplies the digital complex data to the decoding means 514.

The position determining device 502 preferably comprises in addition a memory 546 for storing the positions of the transmitter devices 202, 302 and alternatively for storing both the positions of the transmitter devices 202, 302 as well as building plans or maps of surroundings so as to indicate the position of the object in a building or in the surroundings. For outputting this stored information as wall as the information supplied by the reception information signals, the position determining device 502 may comprise furthermore an information outputting unit for outputting information on the position determined by the calculating means 540 of the processing means 508 of the position determining device 502, the building plan or the map of the surroundings stored in the memory 546 of the position determining device 502 and/or optical or acoustical orientation aids and/or orientation instructions or navigation instructions.

The position determining device 502 preferably comprises, furthermore, an antenna 548 for receiving the reception signal and passing the same to the mixing means 544, and the processing means 514 of the position determining device 502 may comprise, furthermore, a multipath module filter for filtering the reception information signal in order to separate interference signals superimposed on the reception information signals and lying in the same frequency band, and multipath signals from each other.

As already mentioned, the system 100 for determining the position of an object comprises furthermore preferably a connecting means for connecting the transmitter means 208 of the reference transmitter device 202 to the receiver means 306 of each transmitter/receiver device 302 and for transferring the reference time signal to the transmitter/receiver devices 302 in order to synchronize the time of each transmitter/receiver device 302 with the reference time of the reference transmitter device 202 by means of the synchronization means 308 of each transmitter/receiver device 302. The connecting means may be a wireless connection, e.g. via a radio frequency signal, or a wire-bound or cable-bound connection, e.g. via an electrical or optical cable. As already mentioned as well, the system 200 may consist exclusively of transmitter/receiver devices 302 from which individual transmitter/receiver devices 302 are determined to be reference transmitter devices or reference transmitter/receiver devices, respectively. In this case, the connecting means is provided, for example, between a transmitter means 312 of a transmitter/receiver device 302 and receiver means 306 of subordinated transmitter/receiver devices 302 etc.

The present invention renders possible a simple and very accurate determination of the position of an object outdoors and indoors and may be utilized advantageously in particular for navigation and location in buildings or building complexes.

What is claimed is:

1. A system for determining the position of an object, comprising:

a reference transmitter device arranged in a fixed position, said reference transmitter device including:

a) a reference time supplying means for supplying a reference time signal indicating a reference time;

b) a first signal generator for generating a first information signal containing at least the transmission time of the first information signal that is determined from the reference time signal; and c) a first transmitter for transmitting the first information signal and/or the reference time signal, said first transmitter including:

c1) a first code supplying means for supplying a first code associated with the reference transmitter device; and c2) a first coder for coding the first information signal with the first code;

two or more transmitter/receiver devices arranged in fixed positions with respect to each other and to the reference transmitter device, each transmitter/receiver device including:

d) a first time supplying means for supplying a first time signal indicating a first time;

e) a first receiver for receiving the reference time signal from the reference transmitter device;

f) a synchronizer for processing the first time signal and the reference time signal and for synchronizing the first time with the reference time in consideration of the transit times of the reference time signal from the reference transmitter device to the transmitter/receiver device;

g) a second signal processor for generating a second information signal containing at least the transmission time of the second information signal that is determined from the first time signal; and h) a second transmitter for transmitting the second information signal, said second transmitter including:

h1) a second code supplying means for supplying a second code associated with the transmitter/receiver device and differing from the first code of the reference transmitter device and the second codes of the other transmitter/receiver devices; and h2) a second coder for coding the second information signal with the second code; and a position determining device for determining the position of the object, said object including the position determining device and said position determining device including:

i) a second time supplying means for supplying a second time signal indicating a second time;

j) a second receiver for receiving a reception signal containing the first information signal and the second information signals, said second receiver means including:

j1) a third code supplying means for supplying the first code and the second codes;

j2) a decoder for decoding the reception signal using the first code supplied from the third code supplying means and the second codes supplied from the third code supplying means in order to obtain reception information signals corresponding to the first information signal and the second information signals; and j3) a reception time determining means for determining the reception time of each reception information signal with the second time signal of the second time supplying means; and k) a processor for processing the reception information signals, said processing means including:

k1) an extraction means for extracting the transmission times of the first information signal and the second information signals from the reception information signals;

k2) a transit time determining means for determining the transmit times of the first information signal and the second information signals from the reference transmitter device and the transmitter/receiver devices, respectively, to the position determining device on the basis of the transmission times of the first information signal and the second information signals and the reception times of the reception information signals; and k3) a calculator for calculating the position of the object using the transit times of the first information signal and the second information signals and the positions of the reference transmitter device and the transmitter/receiver devices.

2. The system for determining the position of an object according to claim 1, with said first transmitter and said second transmitter further comprising:

c3) a modulator for modulating the first and, respectively, the second information signals onto a carrier signal having a carrier frequency.

3. The system for determining the position of an object according to claim 2, with said second receiver of the position determining device further comprising:

j4) a mixer for mixing the reception signal containing the first and second information signals modulated upon the carrier signal, into an intermediate signal having an intermediate frequency.

4. The system for determining the position of an object according to claim 2, wherein the carrier signal of the modulator is a radio-frequency carrier signal.

5. The system for determining the position of an object according to claim 2, wherein the modulator of the first transmitter means and the second transmitter means as well as the multipath signal filtering and data recovering means of the processor of the position determining device employ phase shift keying modulation (PSK modulation) for modulating the first and, respectively, second information signal and/or the reference time signal onto the carrier signal and for demodulating the first and, respectively, second information signal and/or the reference time signal form the carrier signal.

6. The system for determining the position of an object according to claim 2, with said processing means of the position determining device further comprising:

k4) a multipath signal filtering and data recovering means for demodulating and decoding the reception information signals, so as to synchronize to a reception information format and, possibly, for passing the information data on to the extraction means.

7. The system for determining the position of an object according to claim 6, wherein the processor of the position determining device further comprises:

k5) a multipath module filter for filtering the reception information signals in order to separate multipath signals superimposed on the reception information signals from each other.

8. The system for determining the position of an object according to claim 1, with said decoder of the second receiver of the position determining device comprising furthermore:

at least one correlation means for each reference transmitter device and each transmitter/receiver device of the system for correlating the reception signal with the first and second codes, respectively, associated with the respective reference transmitter device or transmitter/receiver device in order to obtain a correlated reception signal;

one integration means each associated with each correlation means for integrating the correlated reception signal over time so as to obtain a reception information signal associated with the respective reference transmitter device or transmitter/receiver device.

9. The system for determining the position of an object according to claim 8, wherein the correlation means comprises a correlator for correlating the first and second codes, respectively, with the reception signal in order to obtain a correlated reception signal, and wherein the integration means comprises an integrator associated with the correlator for integrating the correlated reception signal over time, so as to obtain the reception information signal associated with the first and second codes, respectively.

10. The system for determining the position of an object according to claim 9, wherein the correlation means comprises furthermore an additional correlator for correlating the time-shifted first and second codes, respectively, with the reception signal, so as to obtain a correlated reception signal, and wherein the integration means comprises furthermore an additional integrator associated with said additional correlator for integrating the correlated reception signal over time, so as to obtain a time-shifted reception information signal associated with the first and second codes, respectively, and differing from the reception information signal reaching the position determining device on a direct path.

11. The system for determining the position of an object according to claim 10, comprising at least three additional correlators and associated integrators for each correlation means associated with a first and second code, respectively.

12. The system for determining the position of an object according to claim 1, further comprising:

a connecting means for connecting the reference transmitter device with each transmitter/receiver device and for transmitting the reference time signal to the transmitter/receiver devices in order to synchronize the first time of each transmitter/receiver device with the reference time of the reference transmitter device by means of the synchronization means of each transmitter/receiver device.

13. The system for determining the position of an object according to claim 12, wherein the connecting means is an electrical or optical cable.

14. The system for determining the position of an object according to claim 1, wherein the first code supplying means, the second code supplying means and the third code supplying means have a memory and/or fed-back shift registers supplying pseudo noise codes (PN codes).

15. The system for determining the position of an object according to claim 1, wherein the first information signal of the first signal generator of the reference transmitter device further comprises the position of the reference transmitter device, wherein the second information signal of the second signal generator of each transmitter/receiver device further comprises the position of the transmitter/receiver device, and wherein the extraction means of the processor of the position determining device (502) furthermore extracts the positions of the reference transmitter device and of the transmitter/receiver devices from the reception information signals.

16. The system for determining the position of an object according to claim 15, wherein the first information signal and the second information signals further comprise local information, local messages, specific system parameters, synchronization data, a map of the surroundings or a building plan and/or directories of reference transmitter devices and/or radio beacons.

17. The system for determining the position of an object according to claim 1, wherein the position determining device further comprises:

l) a memory for storing the positions of the reference transmitter device and of the transmitter/receiver devices.

18. The system for determining the position of an object according to claim 17, wherein the memory of the position determining device further has a building plan or a map of the surroundings stored therein in order to indicate the position of the object in a building or in surroundings.

19. The system for determining the position of an object according to claim 18, wherein the position determining device further comprises:

m) an information outputting unit for outputting information on the position determined by the calculator of the processor of the position determining device, the building plan and/or the map of the surroundings stored in the memory of the position determining device, and/or optical and acoustical orientation aids and/or orientation instructions.

20. The system for determining the position of an object according to claim 1, wherein the reference time supplying means of the reference transmitter device, the first time supplying means of the transmitter/receiver devices and/or the second time supplying means of the position determining device comprise:

a clock for supplying the reference time and/or the first and second times, respectively.

21. The system for determining the position of an object according to claim 20, wherein the synchronizer of each transmitter/receiver device comprises:

f1) a time correction means for correcting the first time of the clock of the first time supplying means using a time correction value representing the difference in time between the reference time of the reference time supplying means of the reference transmitter device and the first time of the first time supplying means of the transmitter/receiver device.

22. The system for determining the position of an object according to claim 1, wherein the reference transmitter device is an additional transmitter/receiver device.

* * * * *